US006662012B1

(12) United States Patent
Do

(10) Patent No.: US 6,662,012 B1
(45) Date of Patent: Dec. 9, 2003

(54) MOBILE AGENT BASED SYSTEM FOR MOBILITY SUPPORT

(75) Inventor: Thanh Van Do, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 618 days.

(21) Appl. No.: 09/579,126

(22) Filed: May 30, 2000

(30) Foreign Application Priority Data

May 31, 1999 (NO) .......................................... 19992605

(51) Int. Cl.$^7$ ............................ H04Q 7/20; H04Q 7/24; H04B 7/212
(52) U.S. Cl. ...................... 455/433; 455/524; 370/331; 370/338
(58) Field of Search ............................... 455/414, 422, 455/432, 433, 435, 445, 461, 524; 370/328, 331, 338; 707/10, 104.1; 709/200, 201, 202, 203, 205, 221, 223, 225, 227, 238, 317

(56) References Cited

U.S. PATENT DOCUMENTS

| | | | | |
|---|---|---|---|---|
| 5,825,759 A | * | 10/1998 | Liu | 370/331 |
| 6,115,736 A | * | 9/2000 | Devarakonda et al. | 709/202 |
| 6,330,586 B1 | * | 12/2001 | Yates et al. | 709/201 |
| 6,477,563 B1 | * | 11/2002 | Kawamura et al. | 709/202 |

FOREIGN PATENT DOCUMENTS

| | | |
|---|---|---|
| WO | 97/04611 | 2/1997 |
| WO | 98/43446 | 10/1998 |
| WO | 98/45989 | 10/1998 |

OTHER PUBLICATIONS

"Intelligent Agents: An Emerging Technology for Next Generation Telecommunications?" T. Magedanz et al., Networking the fifteenth annual joint conference of the IEEE Computer societies networking the next generation; Proceedings IEEE, vol. 2, 1996, pp. 464–472; vol. 2 see pages 470–471, "6.2 Agent–based Intelligent Communication".

"Impacts of Mobile Agent Technology on Mobile communication System Evolution" L. Hagen et al., IEEE Personal Communications, vol. 5, Issue 4, Aug. 1998, pp. 56–69. See p. 60, "Virtual Home Environment".

* cited by examiner

Primary Examiner—Lee Nguyen
Assistant Examiner—Raymond Persino

(57) ABSTRACT

The present invention relates to a method for providing mobility to a user in a telecommunication system composed of different sites. Each site has a Site Agent (SA). The user is represented by a User Agent (UA) which controls three tasks agents, an Application Agent (AA) in charge of the user applications, a Data Agent (DA) in charge of the user data (document files) and a Profile Agent (PA) in charge of the user's profiles. When the user visits a new site, the visiting site agent (SA$_V$) retracts his home UA, causing it to move to the visiting site. The UA investigates the resources available and the users work preferences at the visiting site. UA retracts the tasks agents from the home site, and the tasks agents collect the files that are necessary to implement the requested services.

7 Claims, 5 Drawing Sheets

MOBILE AGENT BASED SYSTEM FOR MOBILITY SUPPORT

This application claims priority under 35 U.S.C. §§119 and/or 365 to 19992605 filed in Norway on May 31, 1999; the entire content of which is hereby incorporated by reference.

BACKGROUND

Ideal Situation For a Mobile User

Ideally a user should be able to access the same applications/services and all his files or documents in exactly the same way, in the same presentation, with the same look-and-feel that he has personalized, no matter when and where he is or no matter what terminal he is using. Indeed, ideally the technology should be able to adapt to the user instead of requiring that the user must adapt to it, as the situation is today.

As depicted in FIG. 1, ideal user mobility means the ubiquitous availability of the user's applications, his data files and his user profiles independently of the terminal in use. The applications comprise both the communication ones such as voice phone, video phone, conferencing, etc and the computing ones such as word processor, spreadsheet, mail, specific software, etc. The applications can use one medium or multiple media such as voice, video and data. The data files are of all types, either structured documents or unstructured raw data files. They can contain data for different types of media such as text, sound, picture or video. The user profiles capture the preferences, subscribed services and personalization that the user has chosen. Each user may have several profiles, for example one main profile for the main presentation and one for each application.

However, the physical characteristics of the underlying network and the terminal such as display size, processing and storage capability, media type, etc. are the unalterable limitations that prevent the total realization of the described ideal situation. Fortunately, the user usually understands such limitations and he is willing to accept some degradation or alteration. But, he has more difficulty to accept that given the required connectivity and a terminal with the required capability he is not able to access his applications, his documents. It is neither acceptable to require that the user must have quite a lot technical knowledge or must perform cumbersome, and time consuming configuration tasks.

PRIOR ART

In order to have a clearer view on how mobility is supported today, let us consider successively the cases of GSM (Global System for Mobile communication), UPT (Universal Personal Telecommunication), Mobile IP and Telnet/Remote login.

GSM (Global System For Mobile Communication)

GSM offers terminal mobility meaning that the mobile user get the access to his services through his mobile cellular phone. GSM has telephony, i.e. voice communication as main application or basic service and a few other applications called supplementary services. The applications/services are well defined and complies with the ETSI (European Telecommunications Standards Institute) specifications. The application software (also called logic) must be installed and run on every location that supports telephony and supplementary applications. Each user has a user profile containing service restriction data such as list of subscribed services, roaming restriction, security data, charging data and routing data. The user profile is stored at the home site of the user, or more specifically in the Home Location Register (HLR). A copy is made and temporally stored at the domain currently visited by the user, or more specifically the Visitor Location Register (VLR). GSM offers very limited storage capability for user data. The existing user data are voice messages or SMS (Short Message Service) messages, which are saved in the home domain.

FIG. 2 shows a user moving from his home domain (HLR) to a visiting domain (VLR) with his phone. In the visiting domain there is installed only logic for basic service, i.e. telephony and supplementary service 1 but not supplementary service 2. Supplementary service 2 is hence not available for him during his visit at the visiting domain, His profile is copied over to the visiting domain and made available for him. His data remains at his home domain and can be accessed through a channel between the visiting domain and his home domain. GSM is functioning very well today when the number and type of applications are relatively small. But in the future with the blooming of applications in number and type combined with the variety in user's preference and choice, it is not rational to expect that all applications will be present at every visiting domain. The user will as a result not be able to access all his applications. Another problem is related to the limited amount of user data that is in disposition of the user. It is reasonable to expect that the user will require more space for his data.

UPT (Universal Personal Telecommunication)

UPT allows the user to make and receive telephone calls from any terminal, fixed or mobile using a unique telephone number called UPT number. UPT can be viewed as a supplementary service built on top of the basic telephony service. Every time the UPT number is dialed, the UPT service is activated and performs the mapping of the UPT number to the number of the telephone that the user is currently used. Before making a call the user registers himself to the UPT service. The UPT service is only installed at the home domain of the user, more specifically in the home Service Control Point (SCP). The user profile is also kept only in the home domain, either in the SCP or the Service Data Point (SDP). UPT does not offer any data storage for the user.

FIG. 3 shows a user using a telephone at a visiting domain. To receive phone calls, he registers to the UPT service at home by calling a green number from the visiting domain. Every call request addressed to him arrives to his home UPT service, which deduces the number of his current terminal. Connection can then be established to this terminal. To make a call, the user dials again the green number of his home UPT service and then enters the number to call. Connection is then prolonged from his home domain to the requested terminal.

Although the UPT concept is valuable for the user it is today not implemented very efficiently since everything must first come the user home domain before going to his final location. A solution is to deploy the UPT service every where but this requires standardization, agreement and collaboration as in GSM.

Mobile IP

IP or Internet Protocol is intended for networks of stationary computers or hosts. Each host is permanently assigned to an IP address that contains both the subnet identity and the host identity. There is no support for mobile hosts. The goal of mobile IP is to remedy this problem by allowing hosts to move and still be in communication with other hosts. By communication it is meant that other hosts are still able to send messages or packets to the mobile host and conversely the mobile host is able to send packets to other hosts. Mobile IP allows a mobile host to use two IP addresses. The home address is static and denotes the home domain, also called home network in mobile IP terminology. The care-of-address is dynamic and changes accordingly to the visiting domain, also called foreign network, to which the mobile host is currently attached. Whenever the mobile host is not at home, the home agent gets all the packets destined for the mobile hosts and forwards them to the foreign agent. The foreign agent arranges to deliver them to the mobile host.

Mobile IP focuses only on providing message communications for the mobile host and does not support the availability of other user applications, user profile or user data. Of course, if everything is stored locally on the mobile host then it will not be a problem. However, it is quite common for a business user to have only a subset of his applications, his data and profile on his laptop while the complete set remains on his corporate home domain. As shown in FIG. 4, if the user wants to access applications, profiles or data that reside only at his home domain then he has to change some configuration parameters. This is a cumbersome, time-consuming and quite boring task which presumes that the user knows the parameters and theirs new values. The user must also remember the initial values of the parameters in order to be able to restore when coming home.

Telnet

In order to access his applications, his data and his profiles the user can also use Telnet, which has existed since the beginning of computer networks. As shown in FIG. 5 Telnet actually establishes a channel from the visiting domain to the home domain and allows the user to access his applications, data and profile located at his home domain. The Telnet protocol provides a standard interface for terminals and terminal-oriented communication. The protocol is normally used over TCP/IP but can also be supported by other protocols. When a Telnet connection is established each side is emulating a "Network Virtual Terminal" (NVT). It is this virtual device that provides the standard interface and hence dictates the look-and-feel. No personalization is possible. When establishing, options requests are sent back and forth as each side tries to negotiate the best possible services. The applications, which can be used from the visiting domain, are restricted by terminal resources, operating system and other restrictions at the application level. As a result, the user can normally access only a subset of his applications. Another disadvantage is the cost and trouble of keeping an open channel over a long period of time.

Problems With Prior Art

From the cases investigated in the previous sections, it is possible to summarize the mechanisms used to implement the mobility support as follows:

Enabling access of user applications, profiles and data located at home: This is done by establishing a channel from the visiting domain to the home domain as in the case of UPT, Mobile IP and Telnet.

Duplication of user applications, profiles and data on the visiting domain: This mechanism has again two variants:
 a. Pre-duplication: This is done in the case of the basic service and some supplementary services in GSM
 b. Dynamic duplication: This is done in the case of the user profile in GSM. Moving code or logic is quite restricted until the emergence of Java.

All the three mechanisms 1, 2a and 2b have both advantages and disadvantages, and are suitable only for a definite application, a definite situation, a definite visiting environment, a definite usage, etc. It is hence not possible to conclude that one mechanism is generally superior to another. Obviously, a combination of all three mechanisms would be the best solution. Further, such a combination should be dynamic, i.e. could be changed according to the situation. None of the current mobile systems is offering such required combination of the three mechanism for mobility support.

BRIEF DESCRIPTION OF THE INVENTION

An object of the present invention is to provide improvements concerning the implementation of mobility support in a telecommunication network. More specifically, this invention enables a mobility support, which is closed to the ideal user mobility.

Another object is to device a method for providing mobility support for a user in a telecommunication network using mobile agents which is based on object-orientation and has high level of modularity. High level of reuse is hence promoted.

A further object of the invention is to device a method with great scalability and flexibility.

The problems with the prior art outlined above is solved according to the invention by introducing the concept of a mobile agent. Agent technology is in use to provide a mobile IP environment, as mentioned above, and is described further in international patent application WO98/459889 (Thanh) belonging to the present applicant. The difference between prior art agent technology and mobile agent technology according to the invention is great. An agent is not mobile but a mobile agent can be relocated. This is especially important in a big distributed system comprising many heterogene nodes which are connected together by many heterogene nets.

The mobile agent concept is very suitable to implement mobility support since it allows all three mechanisms mentioned above and also all possible combinations of them.

In fact, a strategically mobile agent might be the best solution to the mentioned problems. By strategic we mean that the agent will move according to the user preferences, network load and local resources. At a visiting domain, the user makes a request to his user agent, which is originally at his home domain. The user agent can inquire the visiting domain to obtain resource and capability information available on the visiting domain. The user agent can then travel to the visiting domain bringing along the user's profile. It will then initialize the foreign environment and the user's profile will be available to the user. Depending on different factors such as resources at the visiting domain, quality of the underlying network, type of applications, usage duration, etc. the user agent can decide which applications to move and which to access remotely. The combination used for each case will then be the most optimal according to the criteria defined by the user, the user agent and the visiting domain.

The exact scope of the invention is as defined in the appended patent claims.

The invention will be described in detail below with reference to the appended drawings.

DETAILED DESCRIPTION OF EMBODIMENT

In this section we describe our invention which relates an architecture of an agent-based system that improves the support of mobility.

The whole system is composed of different sites. A site is governed by an administrator and can be composed of one of several networks (subnets) of nodes (hosts). Every site has a SA (site Agent) assuming the administration function. It has the responsibility of giving access rights to the agents, garbage collect finished agents and make sure that the security model is not violated. It also has the responsibility to retract, i.e. to move a user agent according to the need of the user.

A user has subscription at a site. He is represented by a UA (User Agent), which acts on behalf of him and takes care of everything when the user is moving. The UA controls three tasks agents: the AA (Application Agent) in charge of the user applications, the DA in charge of the user data (document files) and the PA (Profile Agent) in charge of the user's profiles.

Figure 1:
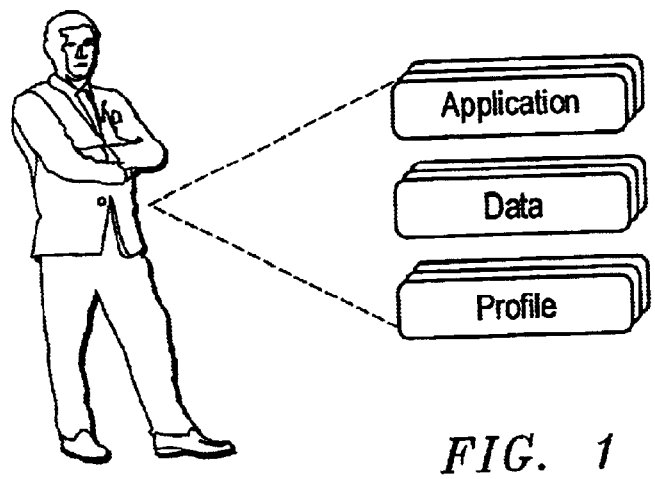
FIG. 1 is a schematic drawing depicting a situation with ideal user mobility including ubiquitous availability of applications, data files and user profiles.
Figure 2:
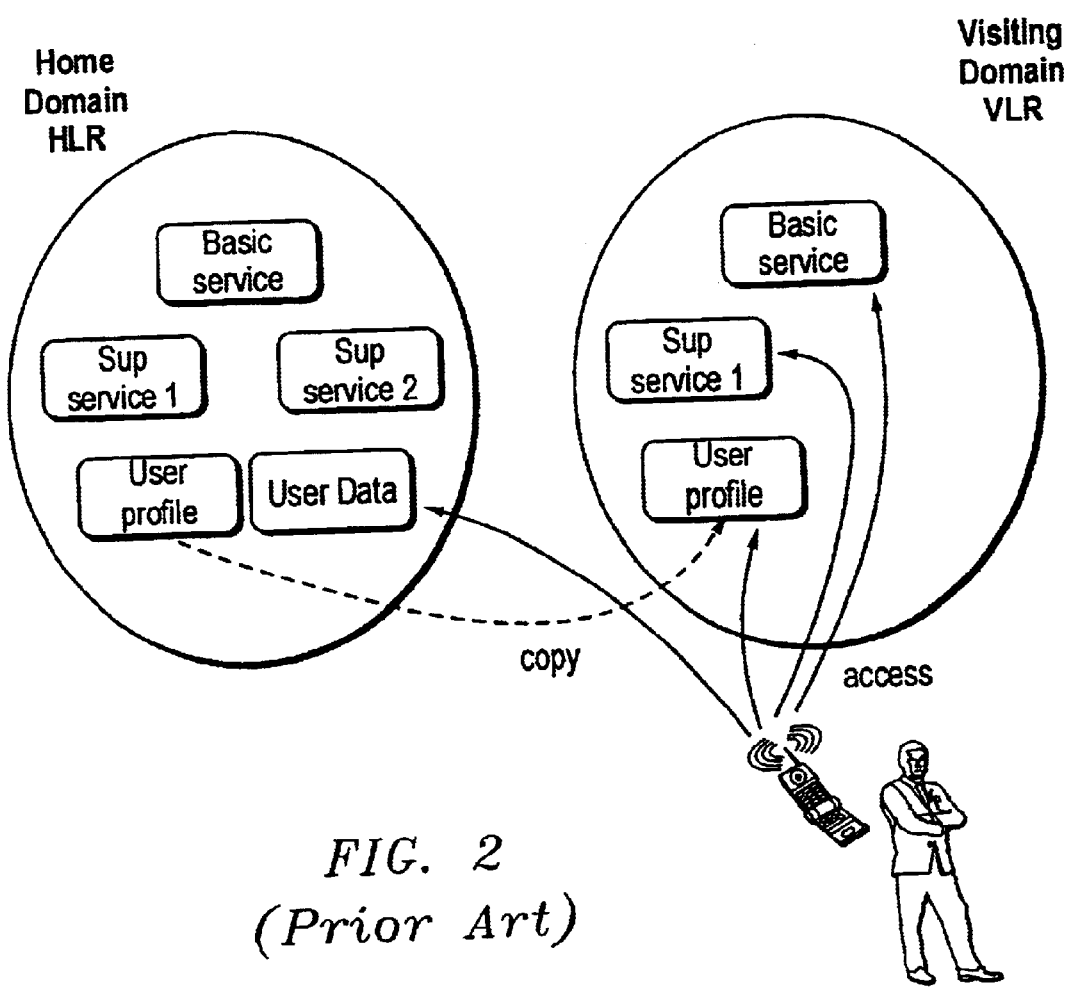
FIG. 2 depicts mobility support in GSM (prior art).
Figure 3:
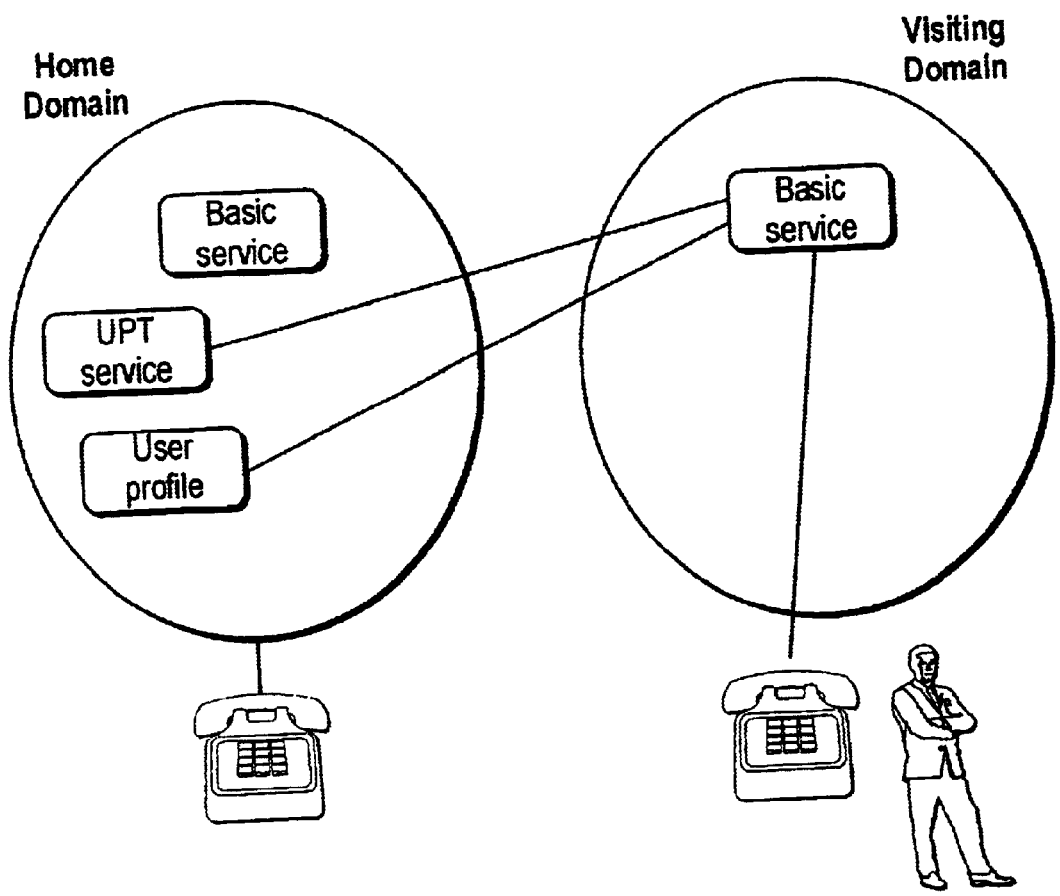
FIG. 3 depicts mobility support in UPT (prior art).
Figure 4:
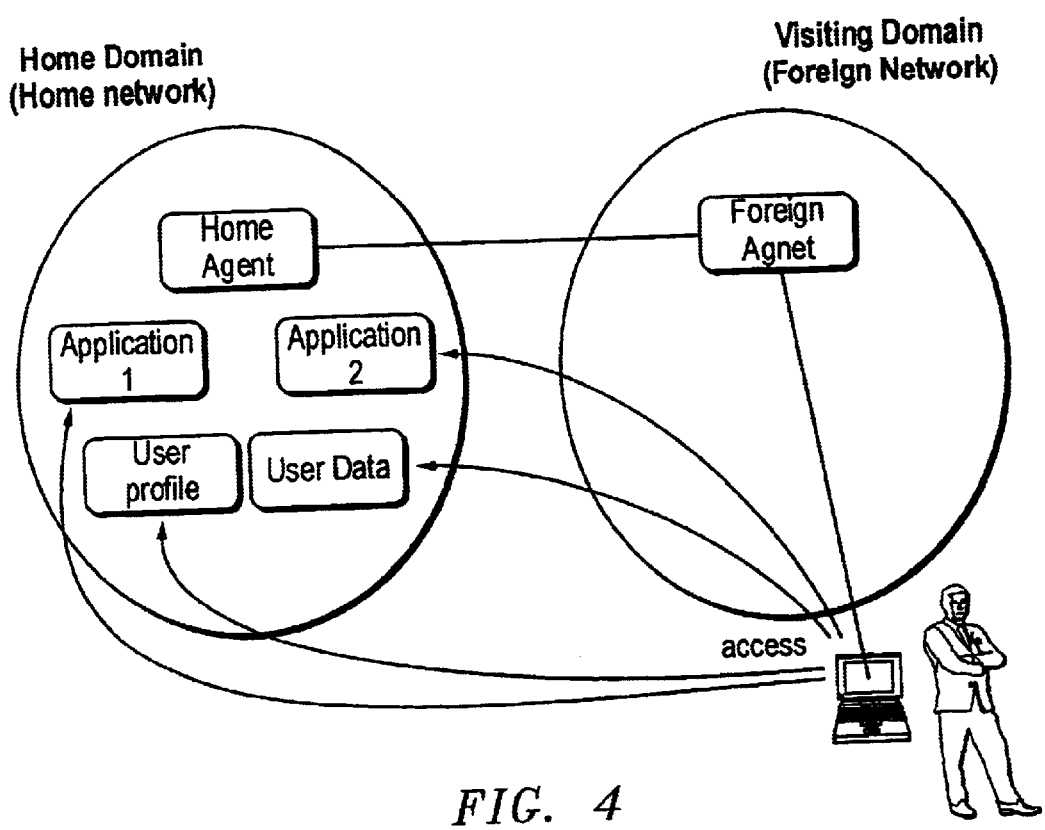
FIG. 4 depicts mobility support with Mobile IP (prior art).
Figure 5:
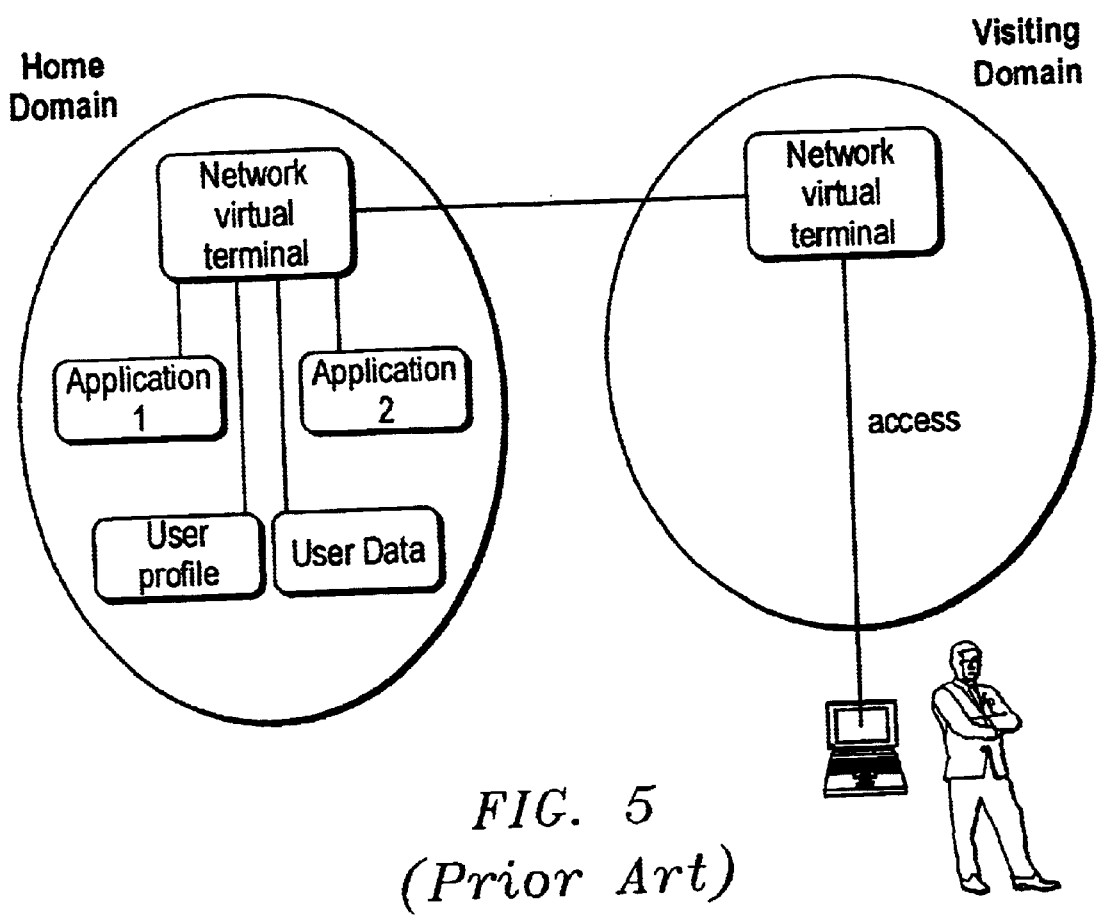
FIG. 5 depicts mobility support with Telnet (prior art)
Figure 6:
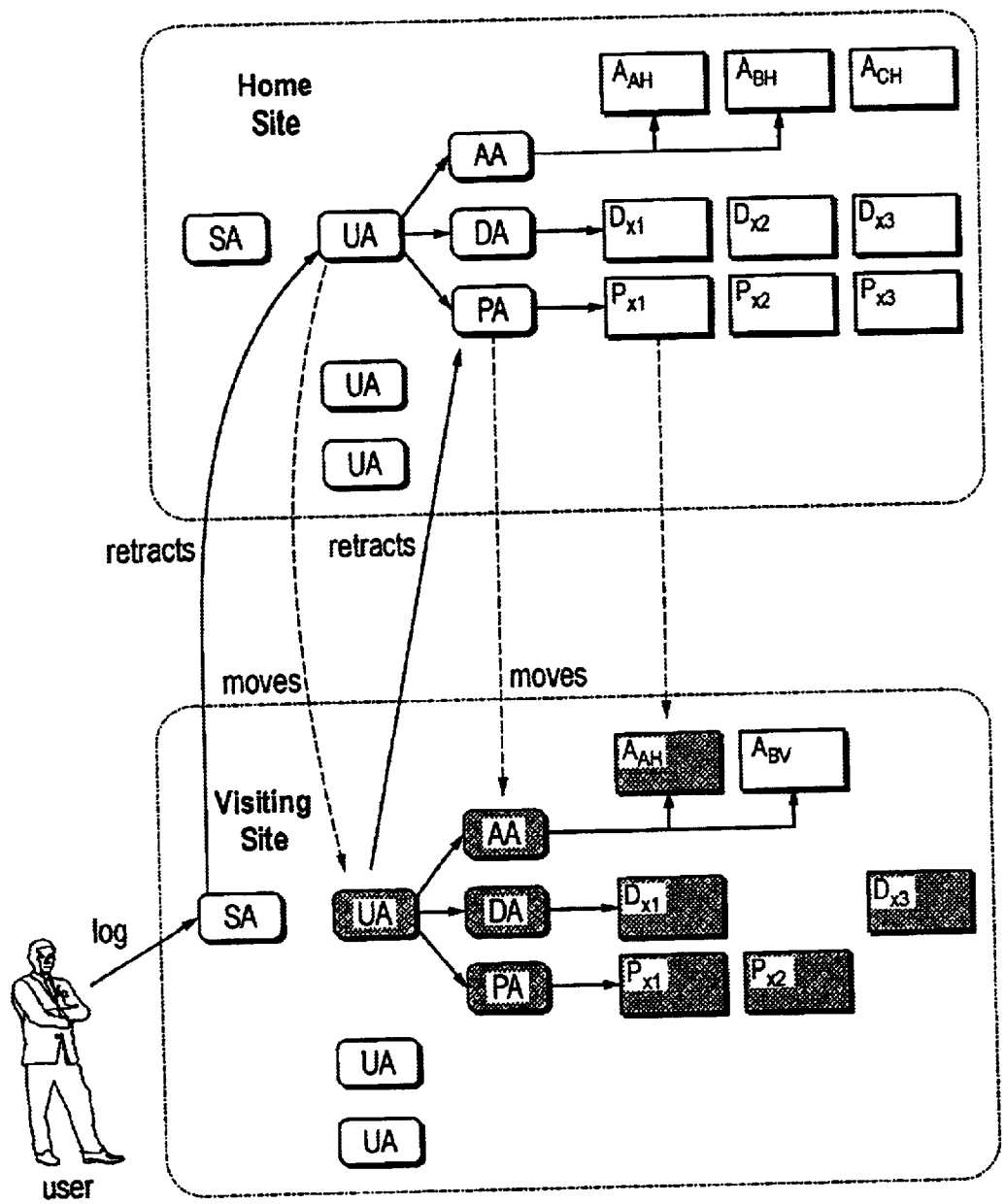
FIG. 6 shows an agent-based system for mobility support according to the present invention.

FIG. 6 illustrates the case of a user X moving to a Visiting site. At his Home site, user X subscribes and has access to applications $A_A$ and $A_B$. Application $A_C$ is available at his home site but he does not use it. He has also the document files $D_{X1}$, $D_{X2}$ and $D_{X3}$. His preferences are registered in the profiles $P_{X1}$, $P_{X2}$ and $P_{X3}$. When visiting the Visiting site, user X needs all his applications $A_A$ and $A_B$, the data files $D_{X1}$ and $D_{X3}$, and the profiles $P_{X1}$ and $P_{X2}$.

When user X logs in at the Visiting site utilizing his user name, which must be a unique identifier, the Visiting site agent $SA_V$ resolves his home site address and communicates with his $UA_X$. The $UA_X$ authenticates user X. if the authentication is successful, the $SA_V$ retracts the $UA_X$ causing it to move to the Visiting site.

When the $UA_X$ arrives and is restored, it starts communicating with the $SA_V$, negotiating the access rights. The $UA_X$ will find out what applications are already available at the host and how much memory and computing resources are available. It will then present this information to the user and suggests that the applications that the user normally uses that are not present, the users data files based on some criteria and the users profile are fetched. In our case, only application $A_A$ needs to be fetched since application $A_B$ already exists. Also, the data files $D_{X1}$ and $D_{X3}$, and profiles $P_{X1}$ and $P_{X2}$ needs to be fetched. Based on the user's answer the $UA_X$ retracts the task agents: $AA_X$, $DA_X$ and $PA_X$ from user X's home site.

When the task agents receive the retraction call, they will start to collect the files that are necessary to implement the requested services. These files might be spread at many different places at the user's home machine or on his local network. The agents then encapsulate these files and migrate to the remote host. In our case, $AA_X$, takes care of $A_A$, $DA_X$ of $D_{X1}$ and $D_{X3}$, and $PA_X$ of $P_{X1}$ and $P_{X2}$. When the agents are restored at the remote host they distribute the files so the files will reside at the same directories as the user is accustomed to. If there are existing files with the same name, the agent will give that file a different name, and changes it back later when the user logs off.

When user X logs off the $SA_V$ will notify the $UA_X$. The $UA_X$ will then ask the task agents if the files that were brought over at the migration have been changed, if that is the case those files must be returned to the home location before the files are destroyed at the remote site. The $UA_X$ then kills the task agents, before it tells the $SA_V$ that the $UA_X$ has finished and lets the $SA_V$ garbage collect it.

This approach will in our opinion lead to ideal user mobility. We could however achieve an even better result if the agents were strategically mobile. With that we mean that based on the speed of the network, the user's travel patterns and the processing powers at the visiting site the UA could make intelligent choices on how to best satisfy those needs. For instance when the UA migrates from the home site to the visiting site, it could measure the speed of the network connection. Based on this information the UA could indicate how long it would take to move the task agents. In another scenario the UA could ask how long the user is planning to work, based on information about the speed of the network, the UA could estimate the price of keeping an open connection (Telnet) or sending over the task agents. This would be a good solution if the applications were large and the user does not plan to work for a long time.

What is claimed is:

1. A method of providing mobility support for a user of a telecommunication system, said system comprising different sites, each site having a Site Agent (SA), wherein the user has a subscription at a home site and is represented by a User Agent (UA), said method being characterised in that:

when the user logs in at a visiting site, a visiting site agent ($SA_V$) retracts the user's home UA, causing the home UA to move the visiting site, wherein the home UA is strategically mobile, with the ability to move to the visiting site and either duplicate the user's applications, data, and profile at the visiting site, or establish a channel from the visiting site to the user's home site, thereby making the user's applications, data, and profiles available to the visiting site; and the UA controls three tasks agents: an Application Agent (AA) in charge of the user applications, a Data Agent (DA) in charge of the user data, and a Profile Agent (PA) in charge of the user's profiles.

2. The method according to claim 1, wherein the agents (UA, AA, PA and DA) selectively determine whether to duplicate the user's applications, data, and profile at the visiting site, or to establish a channel from the visiting site to the user's home site based on selection criteria selected from a group consisting of:

user preferences;

cost;

nature of the user's applications;

length of time the channel must be connected;

security;

internal processing and memory resources; and external resources required for channel establishment.

3. The method according to claim 2, wherein the agents (UA, AA, PA and DA) selectively determine whether to duplicate the user's applications, data, and profile at the visiting site, or to establish a channel from the visiting site to the user's home site on a per application, data and profile basis.

4. The method according to claim 3, wherein the agents (UA, AA, PA and DA) dynamically reselect whether to duplicate the user's applications, data, and profile at the visiting site, or to establish a channel from the visiting site to the user's home site whenever the selection criteria change.

5. The method according to claim 1 wherein when the user logs in at the visiting site, the $SA_V$ resolves the user's home site address and communicates with the user's home UA to determine whether the user has been authenticated.

6. The method according to claim 5, further comprising, after the home UA moves to the visiting site, the steps of:

investigating by the home UA, access rights for the user, resources available for the user, and what services the user requests on the visiting site;

retracting by the home UA, the tasks agents, AA, DA and PA from the user's home site; and collecting by the tasks agents, files from the user's home site that are necessary to implement the requested services on the visiting site.

7. The method according to claim 6, further comprising, when the user logs off, the steps of:

determining whether any of the files collected by the tasks agents have been changed;

returning the files that have been changed to the home site;

killing the tasks agents by the home UA; and garbage-collecting the home UA by the $SA_V$.

* * * * *